(12) United States Patent
O'Donnell et al.

(10) Patent No.: US 10,642,265 B2
(45) Date of Patent: May 5, 2020

(54) SYSTEM AND METHOD FOR CONTROLLING AUTONOMOUS CONSTRUCTION VEHICLES

(71) Applicant: Caterpillar Paving Products Inc., Brooklyn Park, MN (US)

(72) Inventors: Timothy M. O'Donnell, Long Lake, MN (US); John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/059,601

(22) Filed: Aug. 9, 2018

(65) Prior Publication Data
US 2020/0050192 A1 Feb. 13, 2020

(51) Int. Cl.
G05D 1/00 (2006.01)

(52) U.S. Cl.
CPC ......... *G05D 1/0044* (2013.01); *G05D 1/0061* (2013.01); *G05D 1/0088* (2013.01); *G05D 2201/0202* (2013.01)

(58) Field of Classification Search
None
See application file for complete search history.

(56) References Cited

U.S. PATENT DOCUMENTS

| | | | |
|---|---|---|---|
| 8,639,393 B2 | 1/2014 | Taylor et al. | |
| 8,744,626 B2 | 6/2014 | Johnson et al. | |
| 9,376,784 B2 | 6/2016 | O'Donnell | |
| 9,551,366 B2 | 1/2017 | O'Donnell et al. | |
| 9,560,692 B2 | 1/2017 | McGee et al. | |
| 9,575,491 B1 | 2/2017 | Nelson et al. | |
| 9,587,361 B2 | 3/2017 | Oetken et al. | |
| 9,611,595 B2 | 4/2017 | Marsolek et al. | |
| 9,616,752 B2 | 4/2017 | O'Donnell et al. | |
| 9,616,896 B1 | 4/2017 | Letwin et al. | |
| 10,024,708 B2 | 7/2018 | Marsolek et al. | |
| 10,030,339 B2 | 7/2018 | Martin | |
| 10,196,791 B1* | 2/2019 | Oetken | E02D 3/0265 |
| 2012/0089293 A1 | 4/2012 | Halder et al. | |
| 2012/0136507 A1* | 5/2012 | Everett | G05D 1/0297 701/2 |
| 2013/0268138 A1 | 10/2013 | Moughler et al. | |
| 2016/0222602 A1* | 8/2016 | Downing | E01C 19/004 |
| 2017/0167089 A1* | 6/2017 | Marsolek | E01C 19/00 |

* cited by examiner

*Primary Examiner* — Richard M Camby
(74) *Attorney, Agent, or Firm* — Schwegman, Lundberg & Woessner

(57) ABSTRACT

Systems and methods for monitoring and controlling multiple autonomous construction vehicles on a work site are described. The systems include a command and control station located on a mobile construction vehicle working on the worksite. The command and control station provides the ability to control operation of the autonomous construction vehicles.

20 Claims, 6 Drawing Sheets

SYSTEM AND METHOD FOR CONTROLLING AUTONOMOUS CONSTRUCTION VEHICLES

TECHNICAL FIELD

The present disclosure generally relates to the field of construction. More particularly, the present disclosure relates to systems and methods for controlling autonomous construction vehicles, such as paving construction equipment.

BACKGROUND

To rehabilitate roadways for continued vehicular use, spent asphalt is removed in preparation for resurfacing using a cold planer, sometimes also called road mills or scarifiers, to break up and remove layers of an asphalt roadway. A cold planer typically includes a milling drum, fitted with cutting tools, that is rotated to break up the surface of the roadway.

Paving machines are commonly used to apply and spread a mat of asphalt material relatively evenly over a work surface. These machines are generally used in the construction of roads and parking lots. A paving machine generally includes a hopper for receiving asphalt material, a conveyor system for transferring the asphalt from the hopper for discharge onto a roadbed, and a set of augers to evenly spread the paving material in front of a screed plate. The screed plate smooths the asphalt material, ideally leaving behind a mat of uniform depth, density, texture and smoothness.

Compaction machines are frequently employed for compacting fresh laid asphalt, dirt, gravel, and other compactable work materials associated with road surfaces. For example, during construction of roadways, highways, parking lots and the like, the loose asphalt that is deposited by the paving machines is compacted by one or more compactors traveling over the surface, whereby the weight of the compactor compresses the asphalt to a solidified mass.

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite.

SUMMARY

A mobile construction vehicle is described that comprises a frame, an engine coupled to the frame, at least one implement, and a command and control station. The command and control station comprises a controller, a wireless communication module, and a user interface. The command and control station is configured to process a worksite plan having control instructions for an autonomous machine.

A method of controlling an autonomous construction vehicle is described. The method comprises wirelessly transmitting operating instructions from a command and control station of a mobile construction vehicle to the autonomous construction vehicle. The operating instructions are wirelessly received by a control and communication system of the autonomous construction vehicle. The control and communication system then operates the autonomous construction vehicle in response to the received operating instructions.

The present disclosure describes a method of controlling an autonomous construction vehicle that comprises creating a worksite plan for a construction site, and wirelessly transmitting operating instructions, based on the worksite plan, from a command and control station of a mobile construction vehicle to a first autonomous construction vehicle. The method further comprises monitoring, with the command and control station, data transmitted from the first autonomous construction vehicle. The command and control station can edit the worksite plan at least partially in response to the data transmitted from the first autonomous construction vehicle.

DETAILED DESCRIPTION

A system and method for monitoring and controlling multiple autonomous or semi-autonomous construction vehicles on a work site are described herein. The system includes a command and control station on a mobile construction vehicle, such as a road paver, working on the work site.

For the purpose of this disclosure, the term "asphalt" is defined as a mixture of aggregate and asphalt cement. Asphalt is a brownish-black solid or semi-solid mixture of bitumens obtained as a byproduct of petroleum distillation. The asphalt can be heated and mixed with the aggregate for use in paving roadway surfaces, where the mixture hardens upon cooling.

Constructing a new road, parking lot or other paved surface requires several types of constructions equipment. Similarly, re-paving an existing surface also requires different equipment. For example, a cold planer is a machine used to remove layers of hardened asphalt from an existing roadway, a road paver is a machine used to deposit a layer of asphalt, and a compactor is a machine used to compact the deposited asphalt. These machines can be used in combination in a work site to remove existing material, deposit new material and prepare the new material for use.

Figure 1:
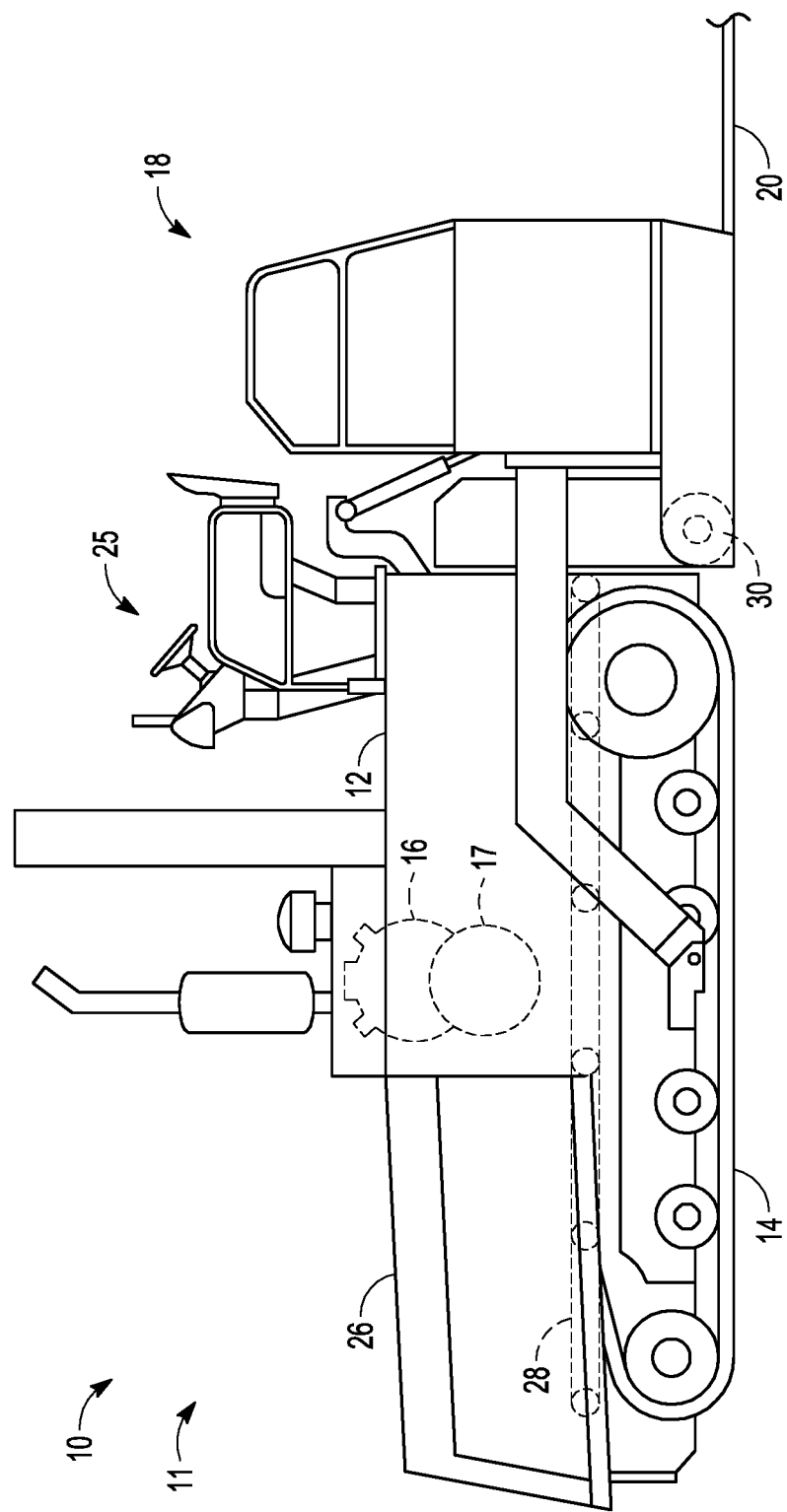
FIG. 1 depicts a paving machine in accordance with this disclosure.

Referring to FIG. 1, a road paver 10 includes a tractor 11 towing a screed assembly 18. The tractor 11 includes a frame 12 that inter-operatively connects the various physical and structural features that enable the paving machine 10 to function. The paver includes a set of ground-engaging elements 14, such as wheels or tracks, coupled with the frame 12. The ground-engaging elements 14 may be driven by an engine 16 in a conventional manner. The engine 16 may further drive an associated generator 17 that can be used to power various systems on the road paver 10. The term "engine," as used herein, is broadly defined as a machine for converting energy into mechanical force and motion. The engine can be powered by combustible fuel, electricity or the like.

The screed assembly 18 is attached at the rear end of the tractor 11 to spread paving material into a mat 20 having a desired shape, thickness, texture, width, density and smoothness. The road paver 10 further includes a hopper 26 for storing paving material, and a conveyor system including one or more conveyors 28 to move paving material from the hopper 26 to the screed assembly 18 at the rear of the road paver 10. One or more augers 30 are arranged near the forward end of the screed assembly 18 to receive the paving material supplied by the conveyor 28 and spread the material evenly in front of the screed assembly 18. The screed assembly 18, hopper 26, augers 30 and conveyor 28 are considered implements. An implement may include any tool, machine, piece of equipment, device or attachment intended for use in construction operations.

The screed assembly 18 may have any of a number of configurations known in the art. For example, it may be a single or multiple section screed. In some embodiments, the screed assembly 18 may include a screed extension (not shown) provided adjacent to each of a left and right main screed sections. The screed extensions may be slideably movable laterally between retracted and extended positions such that varying widths of paving material can be laid. The lateral movement of the extensions may be driven by respective screed width actuators such as hydraulic or electric actuators. It should be noted, however, that in other embodiments the screed extensions may be omitted.

The road paver 10 also includes a command and control station 25. The, as explained below, can have be configured to set a work site plan for autonomous or semi-autonomous vehicles, provide location and performance data of the autonomous machines working on the site, provide incident alerts, and provide remote control capabilities for certain commands or activities. The worksite plan can include site areas (GPS boundaries), a site plan for all machines, and machine set up for all machines. The command and control station 25 can be located for operation by an operator of the paver 10. In other embodiments, paver 10 has separate operator stations for controlling the paver and operating the command and control station 25.

Once the worksite plan is created, the command and control 25 transmits instructs to autonomous machines to execute the plan and monitors progress of the autonomous machines. The operator interfacing with the command and control station 25 can monitor progress and may take over an autonomous machine, with the command and control station, to manually command an autonomous machine.

Figure 2:
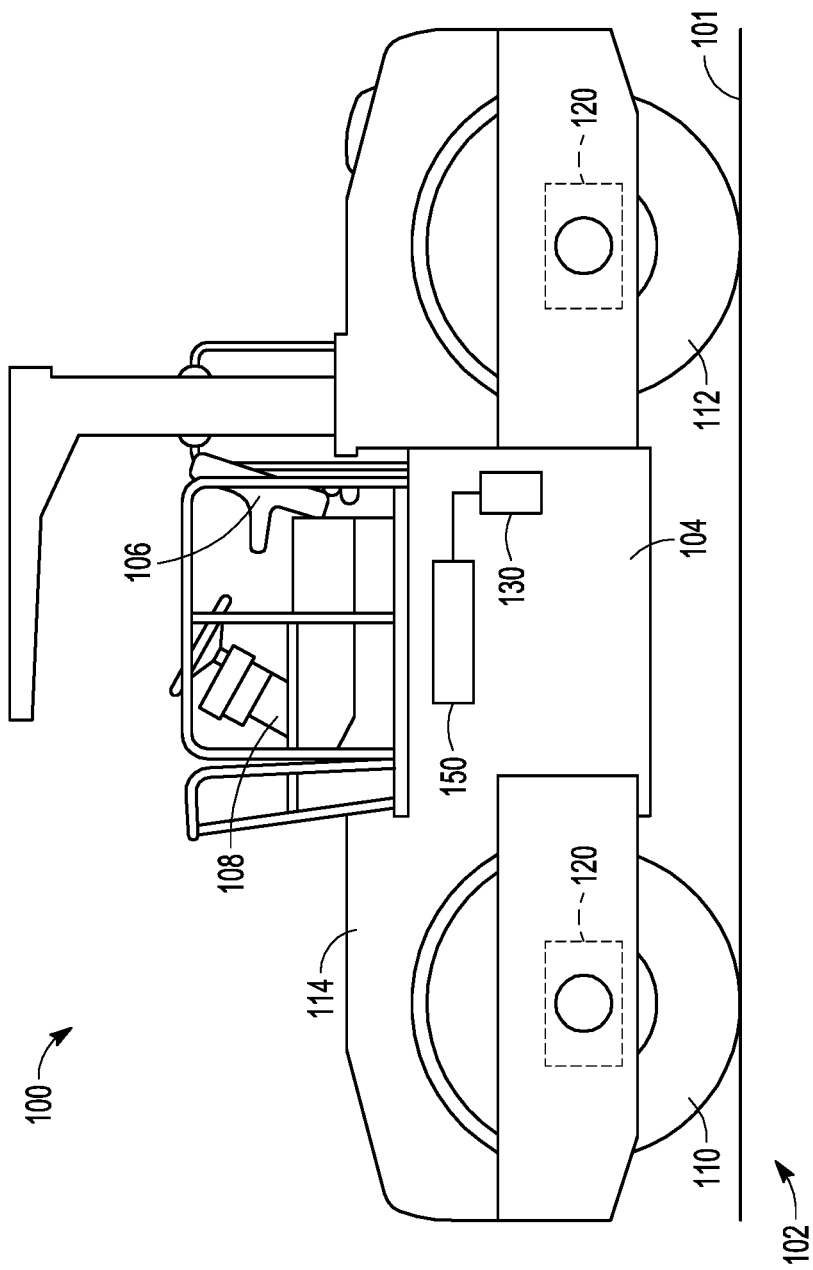
FIG. 2 depicts a compactor machine in accordance with this disclosure.

FIG. 2 illustrates a compactor machine 100, according to one embodiment, that can travel over a surface 101 compacting a work material 102 such as asphalt mat 20 (FIG. 1). Other types of compactors are contemplated to implement the disclosed process and device including soil compactors, asphalt compactors and vibratory compactors, for example. The compactor machine 100 includes a body or frame 104 that inter-operatively connects the various physical and structural features that enable the compactor machine 100 to function. These features may include an operator cab 106 that is mounted on top of the frame 104, from which an operator may control and direct operation of the compactor machine 100. Additionally, a steering apparatus 108 and similar controls may be located within the operator cab 106. To propel the compactor machine 100 over the surface 101, an engine 114, such as an internal combustion engine, can also be mounted to the frame 104 and can generate power to physically move the compactor machine 100.

To enable motion of the compactor machine 100 relative to the surface 101, the illustrated compactor machine 100 includes a first roller drum 110 (or compacting element 110) and a second roller drum 112 (or compacting element 112) that are in rolling contact with the surface 101. Both the first roller drum 110 and the second roller drum 112 are rotatably coupled to the frame 104 so that the first and second roller drums 110, 112 roll over the surface 101 as the compaction machine 100 travels thereon. To transfer motive power from the power system to the surface 101, the power system can operatively engage and rotate the first roller drum 110, the second roller drum 112, or combinations thereof, through an appropriate power train (not shown).

It will be appreciated that the first roller drum 110 can have the same or different construction as the second roller drum 112. It should further be appreciated that the machine 100 may include a single roller drum and tires (not shown) to contact the surface 101. Both the first roller drum 110 and the second roller drum 112 may have a vibratory mechanism 120. While FIG. 2 shows both the first and second roller drums 110, 112 having a vibratory mechanism 120, in other embodiments there may be a single vibratory mechanism 120 located on either the first or the second roller drum 110, 112.

Compactor 100 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 100 and that may cooperate to sense various functions, operations, and operating characteristics of the machine and/or aspects of the environment in which the machine is operating.

A position sensing system 130 may sense the position and orientation the heading, pitch, roll or tilt, and yaw) of the machine relative to the work site. The position sensor 130 may include a plurality of individual sensors that cooperate to generate and provide position signals indicative of the position and orientation of the machine 100. In one example, the position sensor 130 may include one or more sensors that interact with a positioning system such as a global navigation satellite system or a global positioning system to operate as a position sensor. In another example, the position sensor 130 may further include a slope or inclination sensor such as pitch angle sensor for measuring the slope or inclination of the machine 100 relative to a ground or earth reference.

A control and communication system 150 allows the compactor machine to communicate with one or more external systems. In one embodiment, the overall operation of the compactor machine 100 within a worksite may be managed autonomously, or semi-autonomously, by the command and control station 25 located on the paver 10 that is in communication with the compactor machine 100. Moreover, each compactor machine 100 may include any one or more of a variety of feedback devices capable of signaling, tracking, monitoring, or otherwise communicating relevant machine information to the command and control station 25, or other external control system, as explained herein.

Compactor 100 may be controlled by the control and communication system 150 which may receive input signals from an operator operating the machine 100 from within cab 106 or off-board through a wireless communications system. The control and communication system 150 may control the operation of various aspects of the machine 100 including the drivetrain and the hydraulic systems.

Figure 3:
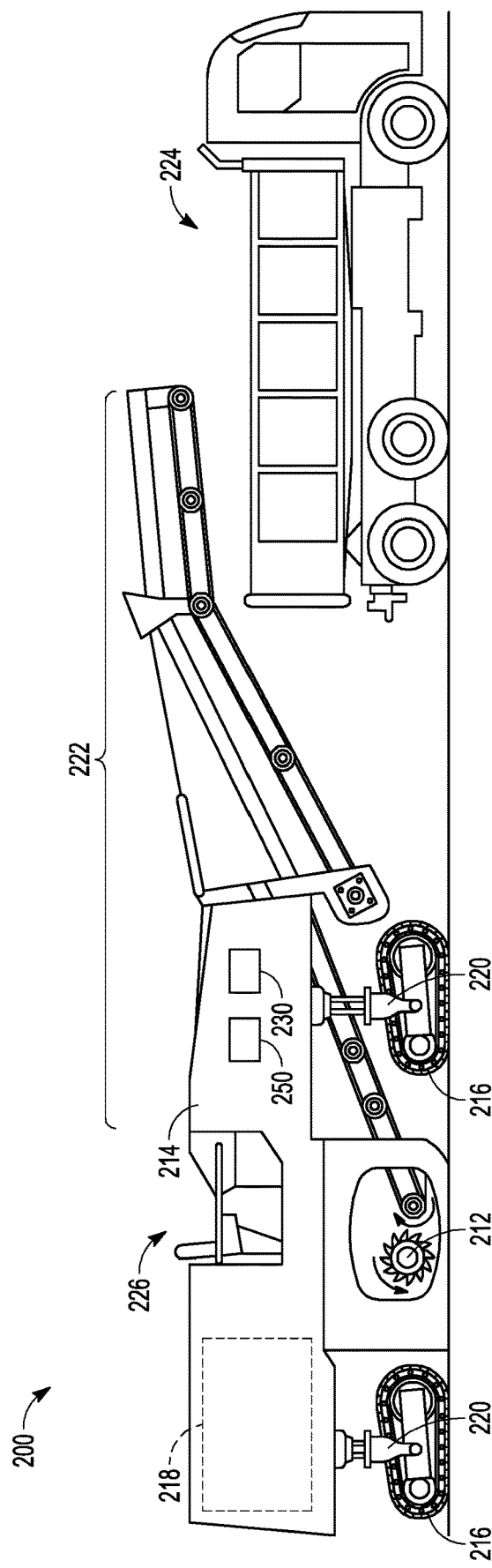
FIG. 3 depicts a cold planer machine in accordance with this disclosure.

FIG. 3 illustrates a cold planer 200 having a frame 214 supported by one or more traction devices 216, a milling drum 212 rotationally supported under frame 214, and an engine 218 mounted to frame 214 to drive milling drum 212 and traction devices 216. Traction devices 216 may include either wheels or tracks connected to actuators 220 that are adapted to controllably raise and lower frame 214 relative to a ground surface. In some embodiments, the same or different actuators 220 may also be used to steer cold planer 200 and or to adjust a travel speed of traction devices 216 (e.g., to speed up or brake traction devices 216), if desired. A conveyor system 222 may be connected at a leading end to frame 214 to transport removed material away from milling drum 212 and into a receptacle, such as a truck 224.

Frame 214 may also support an operator station 226 housing any number of interface devices used to control cold planer 200. In other embodiments, cold planer 200 may be autonomous and may not include operator station 226.

Cold planer 120 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the cold planer 200 and that may cooperate to sense various functions, operations, and operating characteristics of the machine and/or aspects of the environment in which the machine is operating.

A position sensing system 230 may sense the position and orientation the heading, pitch, roll or tilt, and yaw) of the cold planer machine relative to the work site. The position sensor 230 may include a plurality of individual sensors that cooperate to generate and provide position signals indicative of the position and orientation of the machine 200. In one example, the position sensor 230 may include one or more sensors that interact with a positioning system such as a global navigation satellite system or a global positioning system to operate as a position sensor. In another example, the position sensor 230 may further include a slope or inclination sensor such as pitch angle sensor for measuring the slope or inclination of the machine 200 relative to a ground or earth reference.

A control and communication system 250 allows the cold planer 200 to communicate with one or more external systems. In one embodiment, the overall operation of the cold planer 200 within a worksite may be managed autonomously, or semi-autonomously, by the command and control station 25 located on the paver 10 that is in communication with the cold planer. Moreover, each cold planer may include any one or more of a variety of feedback devices capable of signaling, tracking, monitoring, or otherwise communicating relevant machine information to the command and control station 25, or other external control system, as explained herein.

The control and communication systems 150 and 250 may include an electronic computer(s), processor(s), and other electronic controller(s), referred to herein as a controller, that performs operations, executes control algorithms, stores and retrieves data and other desired operations. The term "controller" is meant to be used in its broadest sense to include one or more controllers, computers and/or processors that may cooperate in controlling various functions and operations of the associated machine.

The control and communication systems 150, 250 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the control and communication systems 150, 250 such as power supply circuitry, signal conditioning circuitry, driver circuitry, and other types of circuitry.

The control and communication systems 150, 250 may include a single controller or may include more than one controller configured to control various functions and/or features of the associated machine. The functionality of the control and communication systems may be implemented in hardware and/or software without regard to the functionality. Control and communication systems 150, 250 can control operations of the associated machine independently or operate in response to instructions provided by the command and control station 25, For example, command and control station 25 can instruct compactor 100, via control and communication systems 150, to follow a defined path over a layer of deposited asphalt. If an obstacle is detected by the compacter while it is traveling the defined path, the control and communication system 150 can control the compacter such as adjusting the speed of the compactor.

The control and communication systems 150 and 250 may use position signals from the position sensors 130 and 230 to determine the position of the associated machine within a work site. The position signals may also be used to determine a ground speed of a machine. Other sensors or a dedicated ground speed sensor may alternatively be used to determine the ground speed of the machine. Sensors may also be provided to monitor the operating conditions of the associated machine engine and drivetrain such as an engine speed sensor. Other sensors necessary or desirable for operating the compactor and cold planer machines may be provided.

The control and communication systems 150 and 250 include wireless communication modules, or systems, to send and receive signals with one or more external systems, such as command and control station 25 of paver machine 10, or a remote base station (back office). Wireless communication, as used herein, is broadly defined as any circuitry to transfer information between two or more points that are not connected by an electrical conductor, including radio waves, satellite communication, mobile communication, wireless network communication, infrared communication and bluetooth communication.

Figure 4:
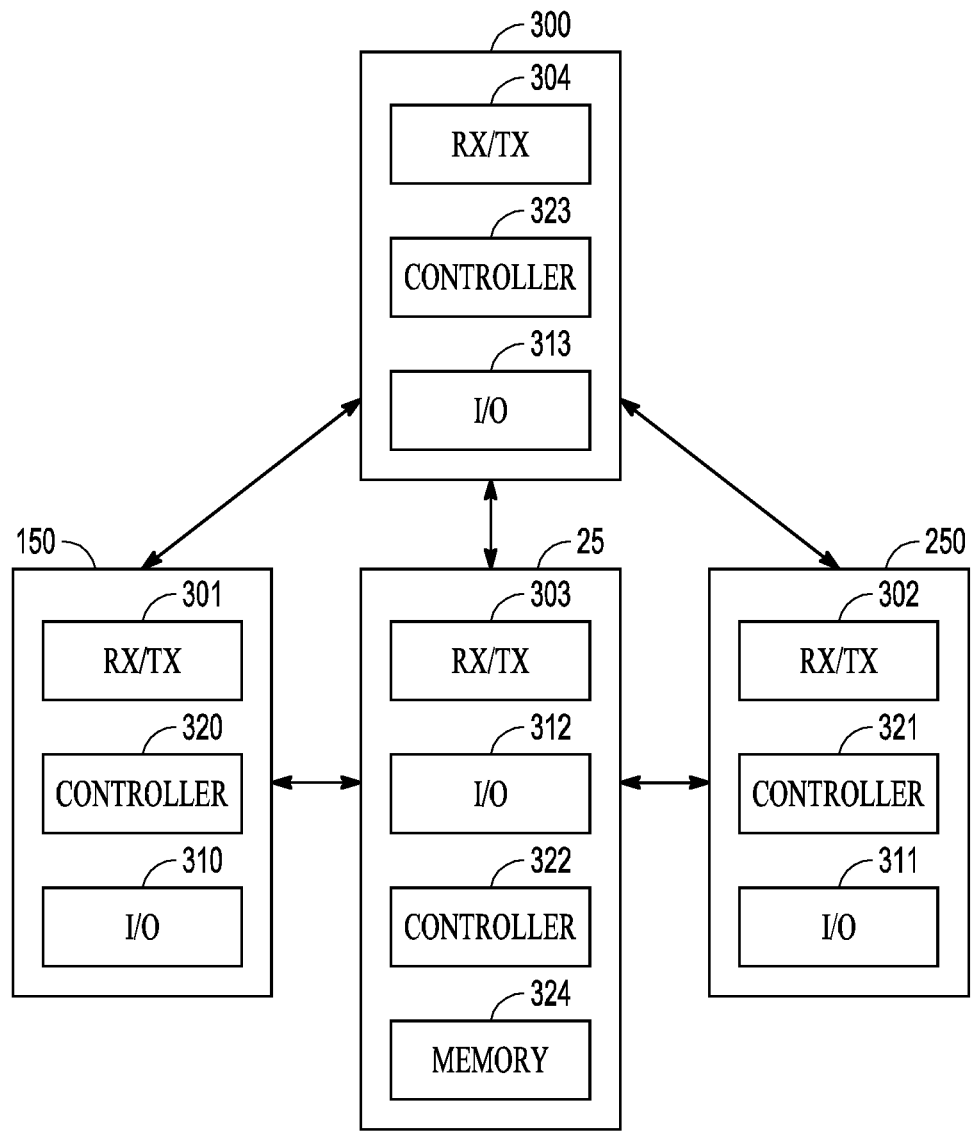
FIG. 4 illustrates a command and control system.

Referring to FIG. 4, a block diagram is provided of the control and communication systems 150 and 250, command and control station 25 and a base station 300, or back office. The overall operation of paver 10, compactor 100 and cold planer 200 within a worksite may be managed autonomously, or semi-autonomously, by the command and control station 25 located on paver 10. The compactors 100 and cold planer 200 can communicate, via control and communication systems 150 and 250, respectively, with command and control station 25. Control and communication systems 150 and 250 can also communicate with base station 300. In some embodiments, control and communication systems 150 and 250 only transmit data signals to the base station 300, while in other embodiments control and communication systems 150 and 250 can also receive data signals from the base station 300.

A wireless communication module, or a transmit and receive (TX/RX) module, 301-304 is provided in each of the control and communication systems 150 and 250, command and control station 25 and base station 300, respectively. Similarly, each of the control and communication systems 150 and 250, command and control station 25 and base station 300 can include a user interface, or an input/output (I/O), 310-313, respectively, such as a graphical display and keyboard, or the like. Further, the control and communication systems 150 and 250, command and control station 25 and base station 300 can include a controller 320-323, respectively.

In one embodiment, control and communication systems 150 and 250 communicate with the base station 300 using a long-distance communication system, such as satellite based communication system. Control and communication systems 150 and 250, in an embodiment, can communicate with the command and control station 25 using local wireless signals. It will be appreciated that any remote communication system and technique capable of transmitting and receiving signals is contemplated.

As described herein, the command and control station 25 can be configured to receive a worksite plan from base station 300, or create a worksite plan for autonomous vehicles. The command and control station 25 can be configured to monitor location and performance data of the autonomous machines working on the worksite and provide status data to the base station. Likewise, command and control station 25 can be configured to provide incident alerts to the base station 300. The base station can provide an initial worksite plan while allowing the command and control station 25 to adjust the plan as needed based on worksite conditions.

The expression "configured to", as used herein, may be replaced with "suitable for," "having the capacity to," "designed to," "adapted to," "made to," or "capable of", according to a context. The term "configured to" does not necessarily mean "specifically designed to" in a hardware level. Instead, the expression that an apparatus is "configured to" may mean that the apparatus is "capable of" along with other devices, hardware, firmware, software or parts in a certain context. For example, "a controller configured to perform an operation" may mean a dedicated controller for performing the operation, or a generic-purpose controller (e.g., a CPU or an application processor) capable of performing the operation by executing one or more software programs stored in a memory device.

The command and control station 25 includes controller 322 that performs operations, executes control algorithms, stores and retrieves data and other desired operations. The command and control station 25 may include, or access, memory 324, secondary storage devices, processors, and any other components for running an application. The memory and secondary storage devices may be in the form of read-only memory (ROM) or random-access memory (RAM) or integrated circuitry that is accessible by the controller. Various other circuits may be associated with the command and control station 25 such as power supply circuitry, signal conditioning circuitry, driver circuitry, and other types of circuitry. User interface 312 can include any interface that a person may use to interact with a controller, including, but not limited to, a display screen, touch screen, keyboard, and a mouse.

Control of machines 10, 100 and 200 may be implemented in any number of different arrangements. For example, control may be at least partially implemented at command and control station 25 situated locally relative to the worksite with sufficient means for communicating with the machines, for example, via local wireless or satellite, or the like. Using any of the foregoing arrangements, command and control station 25 may generally be configured to monitor the position of the machines relative to the worksite and a predetermined target operation, and provide instructions for controlling the machines in an efficient manner.

INDUSTRIAL APPLICABILITY

Figure 5:
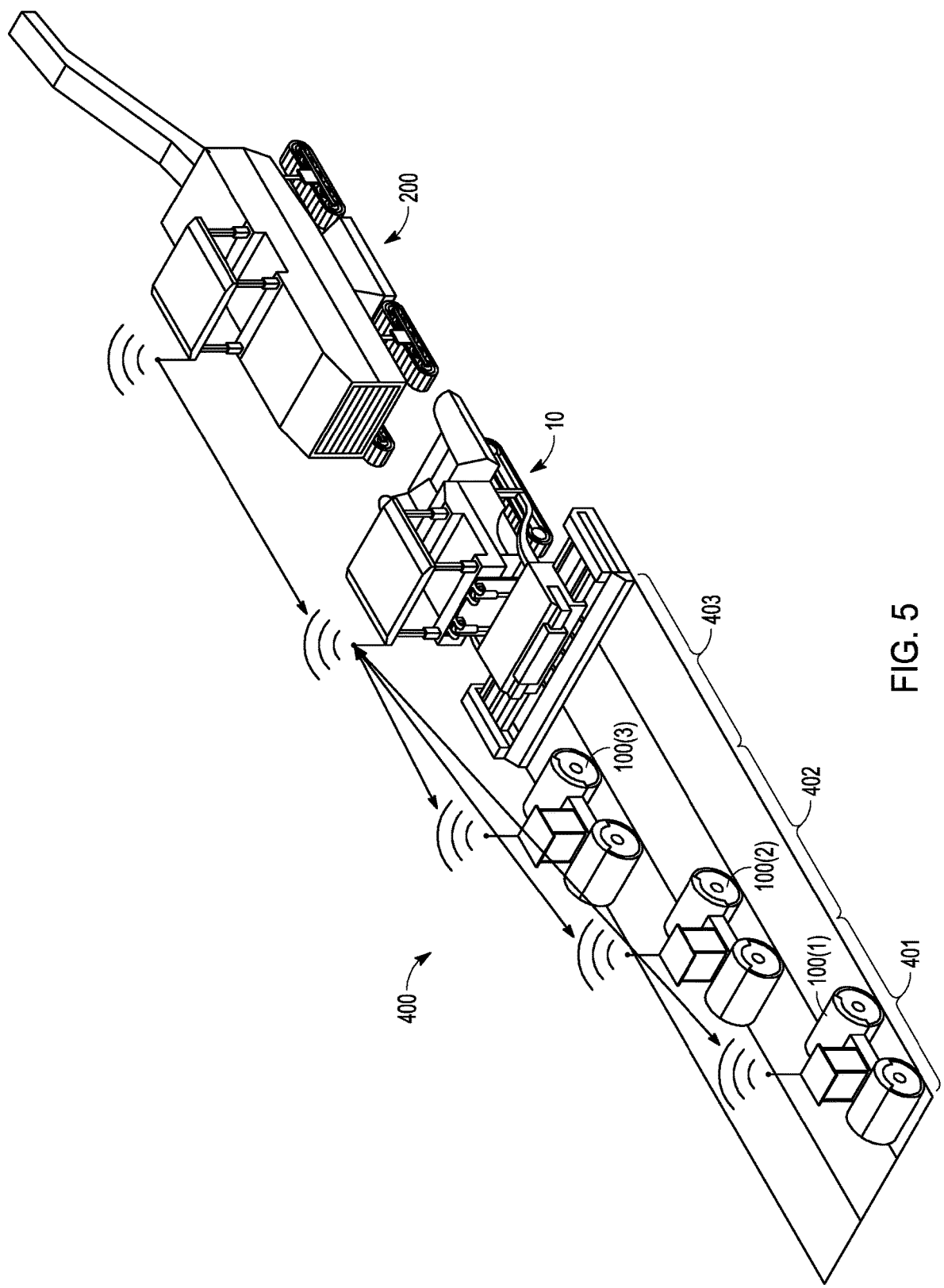
FIG. 5 depicts an example road construction work site in accordance with this disclosure.

Referring to FIG. 5, an example road construction worksite 400 is described including a paver machine 10, a cold planer 200 and three compactors 100(1)-100(3). In operation, the cold planer 200 removes a portion of a road surface, for example the top two inches of the road. The paver 10 follows the cold planer and deposits a layer of new asphalt material on top of the planed road surface. The compactors 100(1)-100(3) then follow the paver to provide primary, intermediate and finished compaction of the asphalt material. Each paver has an assigned zone 401, 402, or 403 of operation. It will be appreciated that the zones do not need to be discreet but can overlap as needed. The operating zones can be defined in a worksite plan, communicated to the compactors, and edited by the command and control 25, as described herein. In this embodiment, three compactors are used to prepare the road surface to a desired compaction, but it is contemplated that more, or less, compactors can be implemented based upon available equipment and worksite conditions.

It will be appreciated that worksite variables such as surface conditions and weather may require on-site adjustments of an initial worksite plan. In this embodiment, the paver 10 operates as a base machine on the worksite and is used by an operator who can control the worksite equipment. The worksite equipment may include compactors, paver, autonomous trucks, autonomous compaction test rovers, autonomous drones, and cold planers/milling machines. The command and control operator can define the worksite plan and setup a paving plan for all machines. Once the plan is defined, the command and control operator can command the autonomous machines to execute the plan. The command and control operator can also monitor progress of each machine and may take over using the command and control station 25 to manually command the machines as may be required for difficult tasks. It will be appreciated that all worksite machines do not need to be autonomous in every embodiment.

In the illustrated embodiment the paver 10 contains the command and control station 25 since the paver machine is central to the paving operation. In other embodiments, the command and control station 25 can be located on another mobile vehicle on the worksite, including cold planer 200, compactor 100 or other vehicle. The command and control station operator may be separate from other paver operators. For example, the command and control operator may only, control the autonomous machines that work with the paver.

As described, a mobile construction vehicle, such as a paver 10, includes a frame, an engine coupled to the frame, at least one implement, and a command and control station. The command and control station includes a controller, a wireless communication module, and a user interface. The command and control station is configured to process a worksite plan for an autonomous vehicle. That is, the processor can execute a prepared worksite plan, create a new worksite plan or edit prepared worksite plan. The command and control station can be configured to monitor location and performance data of the autonomous machine. Likewise, the command and control station can be further configured communicate data signals to a remote base station. For example, the performance of autonomous vehicles can be communicated from the command and control station to the remote base station. In another embodiment, the command and control station is configured to communicate remote control instructions to the autonomous machine. For example, the instructions can be specific to an autonomous machine to follow a worksite plan, such as a machine path and speed.

Figure 6:
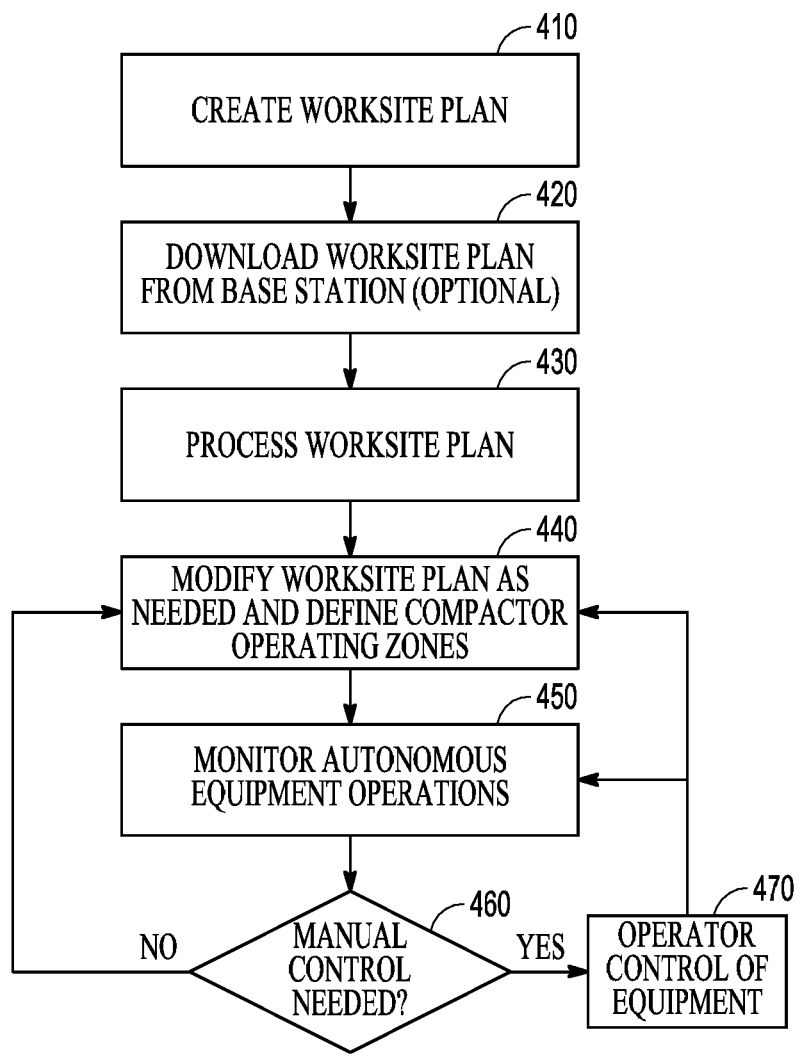
FIG. 6 illustrates steps of a road construction operation.

FIG. 6 illustrates operation of the worksite, in one embodiment, starting with creating a worksite plan at step 410 for a worksite 400. An initial worksite plan can be created with the base station 300 or the command and control station 25. The initial worksite plan, if created at the base station, is downloaded, at step 420, to the command and control station 25 from the base station 300. The initial plan can include GPS edges of the road to be paved, equipment assigned to the worksite, material thickness and compaction levels. It will be appreciated, that additional information and instruction can be provided with the initial plan. In other embodiments, the initial worksite plan can be created using the command and control station 25.

The command and control station 25, at step 430, processes the worksite plan, including but not limited to displaying the worksite plan for an operator and transmitting control instructions to autonomous machines. The initial worksite plan can be modified, or edited, as needed at step 440 by an operator using the command and control station 25. For example, based on worksite conditions the operator may define operating distances, or zones, for each of several compactors. That is, to achieve a target compaction level the asphalt must be compacted under certain temperature conditions. The operator can monitor the road surface conditions and adjust the zones in which each compactor operates behind the paver. Likewise, the operator, using the command and control station 25, can adjust a speed of the paver machine 10 and delivery of asphalt material. The command and control station 25 transmits instruction data to the control and communication system 150 that controls operation of the associated compactor within a defined physical zone.

The command and control station 25 monitors operating data provided by the worksite equipment at step 450. For example, command and control station 25 monitors data provided by sensors of the compactors, cold planer, paver and other equipment such as trucks, compaction test rovers and drones. If manual control is required at step 460 of any worksite equipment, the operator can initiate control using the command and control station 25 at step 470 by communicating operator initiated control signals. The operator can then continue to modify the worksite plan as necessary and monitor operations.

A system and method for monitoring and controlling multiple autonomous construction vehicles on a worksite has been described. The system includes a command and control station on a mobile construction vehicle working on the worksite. The command and control station can provide the ability to set a worksite plan for the autonomous vehicles (including creating and/or modifying a worksite plan), monitor location and performance data of the autonomous machines working on the worksite, provide incident alerts, and provide remote control capabilities for certain commands or activities.

What is claimed is:

1. A mobile construction system comprising:
    a mobile construction vehicle; and
    an autonomous machine,
       wherein the mobile construction vehicle includes:
          a frame;
          an engine coupled to the frame;
          at least one implement; and
          a command and control station including:
             a controller;
             a wireless communication module; and
             a user interface,
             wherein the command and control station is configured to:
                process a worksite plan comprising control instructions for an autonomous machine,
                transmit the control instructions to the autonomous machine,
                edit the worksite plan, and
                transmit edited control instructions to the autonomous machine; and
          wherein the autonomous machine includes a control and communication system configured to:
             receive the control instructions from the mobile construction vehicle;
             operate the autonomous machine in response to the received control instructions; and
             receive the edited control instructions from the mobile construction vehicle.

2. The mobile construction system of claim 1, wherein the command and control station is further configured to monitor location and performance data of the autonomous machine.

3. The mobile construction system of claim 1, wherein the command and control station is further configured to communicate data signals to a remote base station.

4. The mobile construction system of claim 1, wherein the command and control station is further configured to communicate operator initiated control instructions to the autonomous machine.

5. The mobile construction system of claim 1, wherein the mobile construction vehicle is a paving machine, and wherein the at least one implement comprises a screed assembly to spread paving material.

6. The mobile construction system of claim 1, wherein the autonomous machine is a compactor comprising:
    a frame;
    an engine coupled to the frame;
    a roller drum; and
    wherein the control and communication system is configured to communicate data to the command and control station, receive the control instructions including instruction data from the command and control station, and to control operation of the compactor in response to the received instruction data.

7. The mobile construction system of claim 6, wherein the instruction data comprises instructions for the control and communication system to control operation of the compactor within a defined physical zone of a worksite.

8. A method of controlling a construction vehicle, the method comprising:
    wirelessly transmitting operating instructions from a command and control station of a mobile construction vehicle to a second mobile construction vehicle, wherein the second mobile construction vehicle is an autonomous construction vehicle;
    wirelessly receiving the operating instructions with a control and communication system of the second mobile construction vehicle; and
    controlling, by the control and communication system, operation of the second mobile construction vehicle in response to the received operating instructions;
    monitoring, with the command and control station, data transmitted from the second mobile construction vehicle;

editing the worksite plan, with the command and control station, at least partially in response to the data transmitted from the second mobile construction vehicle; and transmitting edited operating instructions, based on the edited worksite plan, from the command and control station of the mobile construction vehicle to the second mobile construction vehicle.

9. The method of claim 8 further comprising creating a worksite plan, with the command and control station, comprising the operating instructions for the second mobile construction vehicle.

10. The method of claim 8 further comprises:
creating a worksite plan comprising the operating instructions for the second mobile construction vehicle;
wirelessly receiving the worksite plan with the command and control station.

11. The method of claim 8 further comprises monitoring, with the command and control station, location and performance data of the second mobile construction vehicle.

12. The method of claim 8, wherein the second mobile construction vehicle comprises a compactor machine and the mobile construction vehicle comprises a paving machine.

13. The method of claim 12, wherein the wirelessly transmitted operating instructions from the command and control station of the paver machine to the control and communication system of the compactor machine comprises data defining a physical operating zone for the compactor within a worksite.

14. A method of controlling an autonomous construction vehicle, the method comprising:
creating a worksite plan for a construction site;
wirelessly transmitting operating instructions, based on the worksite plan, from a command and control station of a mobile construction vehicle to a first autonomous construction vehicle;
monitoring, with the command and control station, data transmitted from the first autonomous construction vehicle;
editing the worksite plan, with the command and control station, at least partially in response to the data transmitted from the first autonomous construction vehicle; and
wirelessly transmitting edited operating instructions, based on the edited worksite plan, from the command and control station of the mobile construction vehicle to the first autonomous construction vehicle.

15. The method of claim 14, further comprising wirelessly transmitting operating instructions, based on the worksite plan, from the command and control station of the mobile construction vehicle to a second autonomous construction vehicle.

16. The method of claim 15, wherein the first and second autonomous construction vehicles comprise first and second compactor machines.

17. The method of claim 16, wherein the worksite plan comprises a first operating zone within the construction site for the first compactor machine, and a second operating zone within the construction site for the second compactor machine.

18. The method of claim 17, further comprising editing the worksite plan, with the command and control station, to change the first and second operating zones.

19. The method of claim 14, wherein the worksite plan for the construction site is created remotely from, and wirelessly transmitted to, the command and control station of the mobile construction vehicle.

20. The method of claim 14, further comprising transmitting status data from the command and control station of the mobile construction vehicle to a remote base station.

* * * * *